(12) United States Patent
Narayan et al.

(10) Patent No.: US 8,186,142 B2
(45) Date of Patent: May 29, 2012

(54) SYSTEMS AND METHOD FOR CONTROLLING STACK TEMPERATURE

(75) Inventors: Prakash Narayan, Tamil Nadu (IN); Shinoj Vakkayil Chandrabose, Kerala (IN); Pemmi Bhaskar, Chhattisgarh (IN)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 12/185,931

(22) Filed: Aug. 5, 2008

(65) Prior Publication Data

US 2010/0031625 A1 Feb. 11, 2010

(51) Int. Cl.
*F02C 1/00* (2006.01)
*F02C 7/08* (2006.01)
*F02C 6/00* (2006.01)

(52) U.S. Cl. .................. 60/39.182; 60/39.5; 60/772

(58) Field of Classification Search ............... 60/39.182, 60/736, 39.5, 772, 775; 122/7 R, 7 D
See application file for complete search history.

(56) References Cited

U.S. PATENT DOCUMENTS

| | | | |
|---|---|---|---|
| 3,118,429 A * | 1/1964 | Hochmuth | 122/7 R |
| 3,965,675 A * | 6/1976 | Martz et al. | 60/39.182 |
| 4,353,206 A | 10/1982 | Lee | |
| 4,354,347 A * | 10/1982 | Tomlinson et al. | 60/39.182 |
| 4,371,027 A | 2/1983 | Jacobsen | |
| 4,829,938 A * | 5/1989 | Motai et al. | 122/7 R |
| 4,841,722 A | 6/1989 | Bjorge | |
| 4,961,311 A | 10/1990 | Pavel et al. | |
| 5,267,434 A | 12/1993 | Termuehlen et al. | |
| 5,285,629 A * | 2/1994 | Gounder | 60/39.12 |
| 5,649,416 A | 7/1997 | Moore | |
| 5,799,481 A | 9/1998 | Fetescu | |
| 6,041,588 A | 3/2000 | Bruckner et al. | |
| 6,134,873 A | 10/2000 | Nakhamkin et al. | |
| 6,145,295 A | 11/2000 | Donovan et al. | |
| 6,167,706 B1 | 1/2001 | Bronicki et al. | |
| 6,173,563 B1 | 1/2001 | Vakil et al. | |
| 6,178,734 B1 | 1/2001 | Shibuya et al. | |
| 6,269,626 B1 | 8/2001 | Kim | |
| 6,389,794 B2 | 5/2002 | Ranasinghe et al. | |
| 6,389,797 B1 * | 5/2002 | Sugishita et al. | 60/39.182 |
| 6,499,302 B1 | 12/2002 | Ranasinghe | |
| 6,608,395 B1 | 8/2003 | Steinway | |
| 6,615,575 B2 | 9/2003 | Liebig | |
| 6,782,703 B2 | 8/2004 | Dovali-Solis | |
| 6,920,760 B2 | 7/2005 | Schottler et al. | |
| 6,957,540 B1 | 10/2005 | Briesch et al. | |
| 7,107,774 B2 | 9/2006 | Radovich | |
| 7,131,259 B2 | 11/2006 | Rollins, III | |
| 7,343,746 B2 | 3/2008 | Pierson | |
| 2007/0017207 A1 | 1/2007 | Smith et al. | |

* cited by examiner

*Primary Examiner* — Ehud Gartenberg
*Assistant Examiner* — Gerald Sung
(74) *Attorney, Agent, or Firm* — Armstrong Teasdale LLP

(57) ABSTRACT

Systems and a method for controlling a temperature of an exhaust gas stack are provided. The system includes a first heat exchanger positioned upstream in exhaust gas flow communication to an exhaust gas inlet to the stack, a second heat exchanger positioned upstream in exhaust gas flow communication to the first heat exchanger, and a water side conduit configured to direct a flow of relatively hot water from the second heat exchanger to the first heat exchanger such that a temperature of a flow of exhaust gas flowing through the first exchanger is maintained within a predetermined range.

20 Claims, 4 Drawing Sheets

SYSTEMS AND METHOD FOR CONTROLLING STACK TEMPERATURE

BACKGROUND OF THE INVENTION

This invention relates generally to power generation systems and, more particularly, to a system and assemblies for controlling a temperature of exhaust gases in a stack of a combined cycle power plant.

At least some known combined cycle power generation systems include a gas turbine and a steam turbine in combination to produce power. The power plant is arranged such that the gas turbine is thermally connected to the steam turbine through a heat recovery steam generator ("HRSG"). The HRSG is a non-contact heat exchanger that allows feedwater for the steam generation process to be heated by otherwise wasted gas turbine exhaust gases. The HRSG is a large duct with tube bundles interposed therein such that water is heated to steam as the exhaust gases pass through the duct. The primary efficiency of the combined cycle arrangement is the utilization of the otherwise wasted gas turbine exhaust gases.

Modern combined cycles typically employ two or three steam generation pressures to recover the maximum energy from the gas turbine exhaust. The HRSG heat exchange process is a counterflow process in that the temperature of the hot exhaust gases decreases as they move through the HRSG to the stack whereas the temperature of the steam water mixture in the tubes increases as it is channeled towards the HRSG gas inlet against the flow of hot exhaust gases.

One key parameter in optimizing the combined cycle efficiency is that the highest efficiency is achieved with the lowest stack gas temperature at the outlet end of the exhaust gas stack. The lower limit on stack gas temperature is usually proscribed by the sulfur content in the gas turbine fuel. This is because sulfur compounds condense on the tube bundles at certain relatively low temperatures causing severe corrosion on the tube bundles. It is also known that the dew point of the corrosive sulfur compounds increases with increased concentration of sulfur in the fuel.

At least some known methods for optimizing a combined cycle plant efficiency includes a design of the HRSG and steam system to operate with a stack gas temperature that would prevent low temperature heat transfer surface corrosion commensurate with the highest level of sulfur content in the fuel expected to be burned in the specific application. If fuel is burned with lower fuel sulfur content, the HRSG stack gas temperature cannot be lowered to improve efficiency although the sulfur compound concentration would allow it. Conversely, if the HRSG were designed with stack gas temperature commensurate with the lowest fuel sulfur content to be expected, the plant efficiency would be improved; however, the HRSG heat transfer surface would experience corrosion if the fuel with higher sulfur content were burned. However, such a method narrowly limits the sulfur content of the fuel and consequently narrows the type of fuel capable of being burned.

BRIEF DESCRIPTION OF THE INVENTION

In one embodiment, a system for controlling a temperature of an exhaust gas stack includes a first heat exchanger positioned upstream in exhaust gas flow communication to an exhaust gas inlet to the stack, a second heat exchanger positioned upstream in exhaust gas flow communication to the first heat exchanger, and a water side conduit configured to direct a flow of relatively hot water from the second heat exchanger to the first heat exchanger such that a temperature of a flow of exhaust gas flowing through the first exchanger is maintained within a predetermined range.

In another embodiment, a method of controlling a temperature of an exhaust gas stack includes transferring heat from a flow of exhaust gas to a flow of water in a first heat exchanger and transferring heat from the flow of water to the flow of exhaust gas using a second heat exchanger downstream of the first heat exchanger in a direction of the flow of exhaust gas.

In yet another embodiment, a combined cycle power generation system includes at least one gas turbine and at least one steam turbine thermally interconnected through at least one heat recovery steam generator. The combined cycle power generation system further includes a first heat exchanger positioned upstream in exhaust gas flow communication to a heat recovery steam generator exhaust gas outlet, a second heat exchanger positioned upstream in exhaust gas flow communication to the first heat exchanger, and a water side conduit configured to direct a flow of relatively hot water from the second heat exchanger to the first heat exchanger such that a temperature of a flow of exhaust gas flowing through the first exchanger is facilitated being increased.

BRIEF DESCRIPTION OF THE DRAWINGS

FIG. 1 is a schematic diagram of an exemplary combined cycle power generation system in accordance with an exemplary embodiment of the present invention;

FIG. 2 is a schematic diagram of an integrated gasification combined cycle (IGCC) power generation system in accordance with an exemplary embodiment of the present invention;

FIG. 3 is a schematic diagram of a natural gas fired combined cycle power generation system in accordance with an exemplary embodiment of the present invention; and FIG. 4 is a flow diagram of an exemplary method of controlling a temperature of an exhaust gas stack.

DETAILED DESCRIPTION OF THE INVENTION

The following detailed description illustrates embodiments of the invention by way of example and not by way of limitation. It is contemplated that the invention has general application to improving efficiency of combustion and power generation systems by using progressively higher grade heat to preheat a fuel flow to a combustor in industrial, commercial, and residential applications. As used herein high grade heat refers to heat at a relatively high temperature, low grade heat refers to heat at a relatively low temperature, and intermediate grade heat refers to heat at a temperature between that of low and high grade heat.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
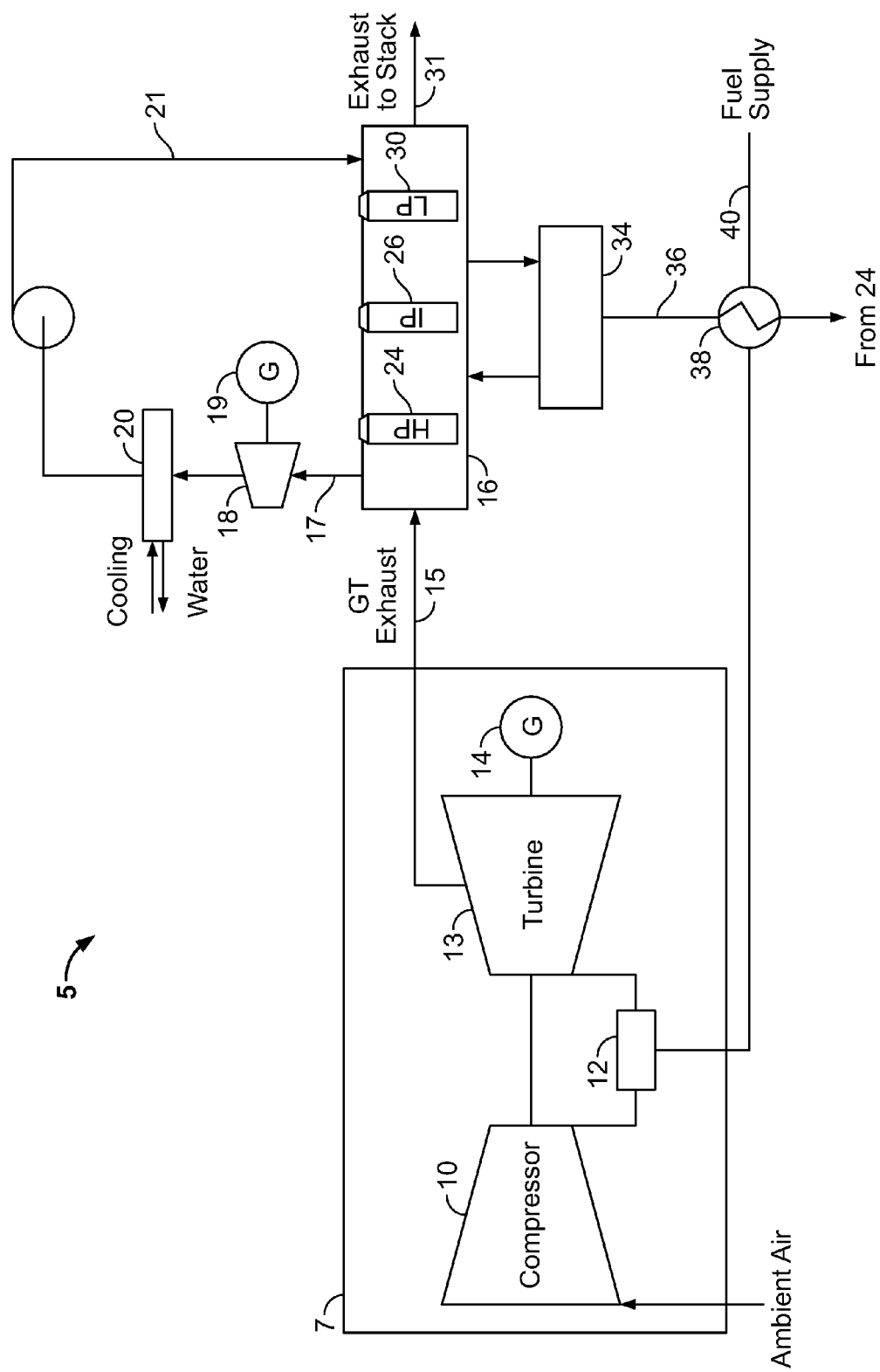
FIGS. 1-4 show exemplary embodiments of the systems and method described herein.

FIG. 1 is a schematic diagram of an exemplary combined cycle power generation system 5 in accordance with an exemplary embodiment of the present invention. Power generation system 5 includes a gas turbine engine assembly 7 that includes a compressor 10, a combustor 12, and a turbine 13 powered by expanding hot gases produced in combustor 12 for driving an electrical generator 14. Exhaust gases from gas turbine 13 are supplied through a conduit 15 to a heat recovery steam generator (HRSG) 16 for recovering waste heat from the exhaust gases. In the exemplary embodiment, HRSG 16 includes high pressure (HP) section 24, intermediate pressure (IP) section 26, and low pressure (LP) section 30. However in other embodiments, HRSG 16 is divided into other numbers and pressure ranges. HRSG 16 is configured to transfer progressively lower grade heat from exhaust gases to water circulating through each progressively lower pressure section. Each of the HP, IP, and LP sections 24, 26, and 30 may include an economizer, an evaporator, a superheater and/or feedwater or other pre-heaters associated with the respective section, such as but not limited to a high pressure section pre-heater, which may be split into multiple heat exchangers, which are then positioned in one or more of the sections (HP, IP, LP). The section economizer is typically for pre-heating water before it is converted to steam in for example, the evaporator.

Water is fed to the HRSG 16 through conduit 21 to generate steam. Heat recovered from the exhaust gases supplied to HRSG 16 is transferred to water/steam in the HRSG 16 for producing steam which is supplied through line 17 to a steam turbine 18 for driving a generator 19. Line 17 represents multiple steam lines between the HRSG 16 and steam turbine 18 for the steam produced at different pressure levels. Cooled gases from the HRSG 16 are discharged into atmosphere via exit duct 31 and a stack (not shown).

In the exemplary embodiment, combined-cycle power plant 5 further includes a stack temperature control system 34 positioned as a stand alone device separate from HRSG 16. In an alternative embodiment, stack temperature control system 34 is positioned within HRSG 16. Water and/or steam are extracted from one or more sections of HRSG and channeled to stack temperature control system 34. A flow of fuel heating water 36 is channeled from a heat exchanger in HP section 24 through a fuel heater 38 where the temperature of a flow of fuel flowing through fuel heater 38 is increased and the flow of water from the heat exchanger in HP section 24 is reduced. A flow of fuel 40 is directed through fuel heater 38 where flow of fuel 40 receives heat transferred from the flow of fuel heating water 36. The heated fuel is channeled to combustor 12. The cooled flow of fuel heating water 36 is directed to stack temperature control system 34.

Figure 2:
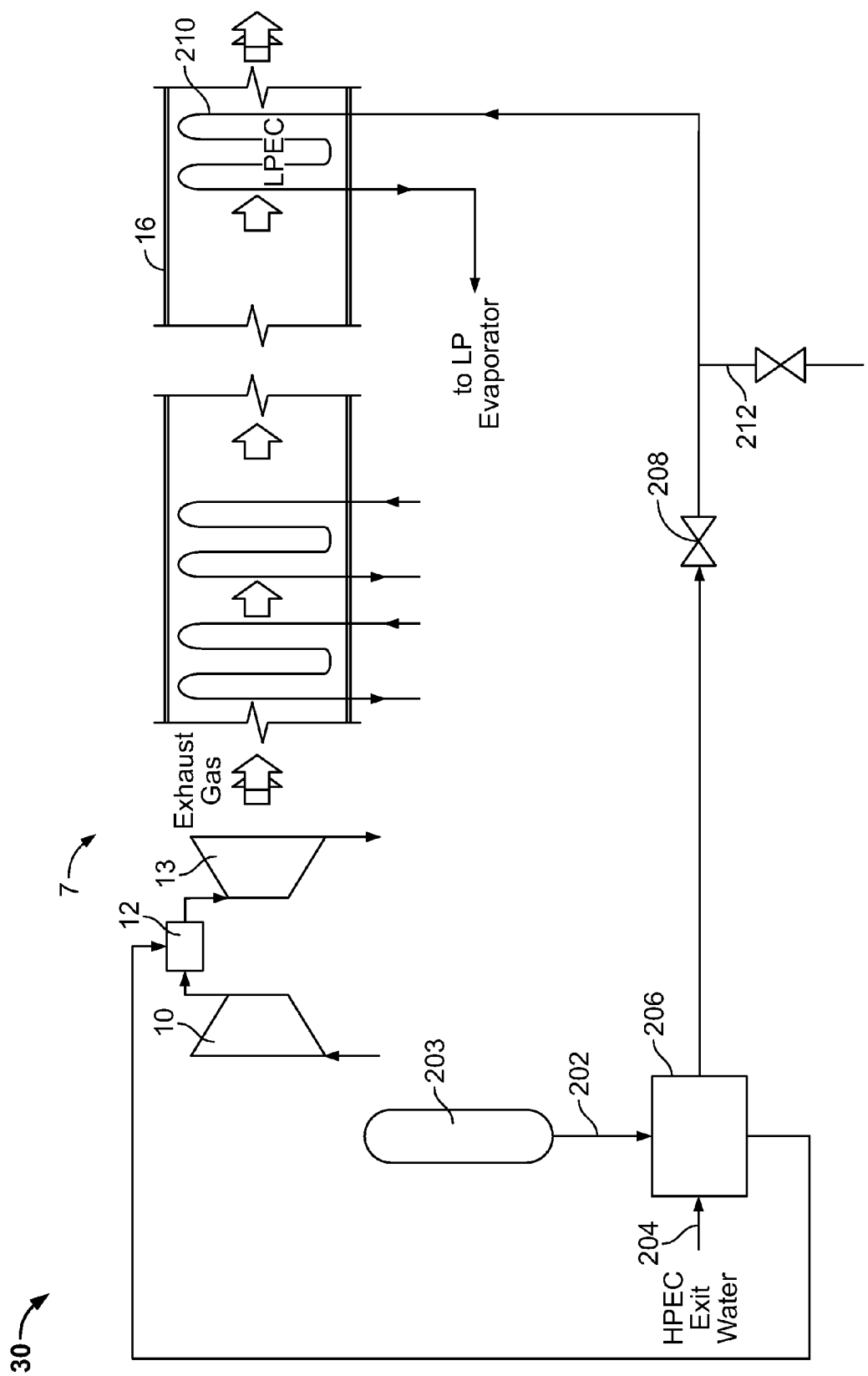

FIG. 2 is a schematic diagram of an integrated gasification combined cycle (IGCC) power generation system 200 in accordance with an exemplary embodiment of the present invention. In the exemplary embodiment, a flow of syngas 202 from a gasifier 203 is heated from a temperature of approximately 360° F. to approximately 570° F. using a flow of high pressure (HP) economizer water 204 supplied to a fuel heater 206. The water downstream of fuel heater 206 is cooled to a temperature of approximately 310° F. and at a relatively high pressure. During partial load operations, the cooled water is channeled from fuel heater 206 through a pressure reducing valve 208 to a low pressure (LP) economizer 210 at an outlet of HRSG 16 to regulate a temperature of the flow of exhaust gases directed to an exhaust stack (not shown). To control a mass flow of the water directed to the economizer 210, a flow bypass line 212, and flow regulating valve permit flow to bypass economizer 210 modulating the amount of heat available to economizer 210 and the gas exiting HRSG 16. By controlling the bypass flow and/or the temperature of the flow of water being directed to economizer 210, the stack temperature may be controlled over a wide operating range of system 200. For example, at low loads heat may be added to economizer 210 to increase the outlet temperature of HRSG 16. At relatively high loads, heat may be bypassed around economizer 210 to other heat exchangers in HRSG 16 to improve efficiency of system 200. Controlling the stack temperature to the minimum temperature required to meet gas dew point considerations permitting more efficient operation of system 200.

Figure 3:
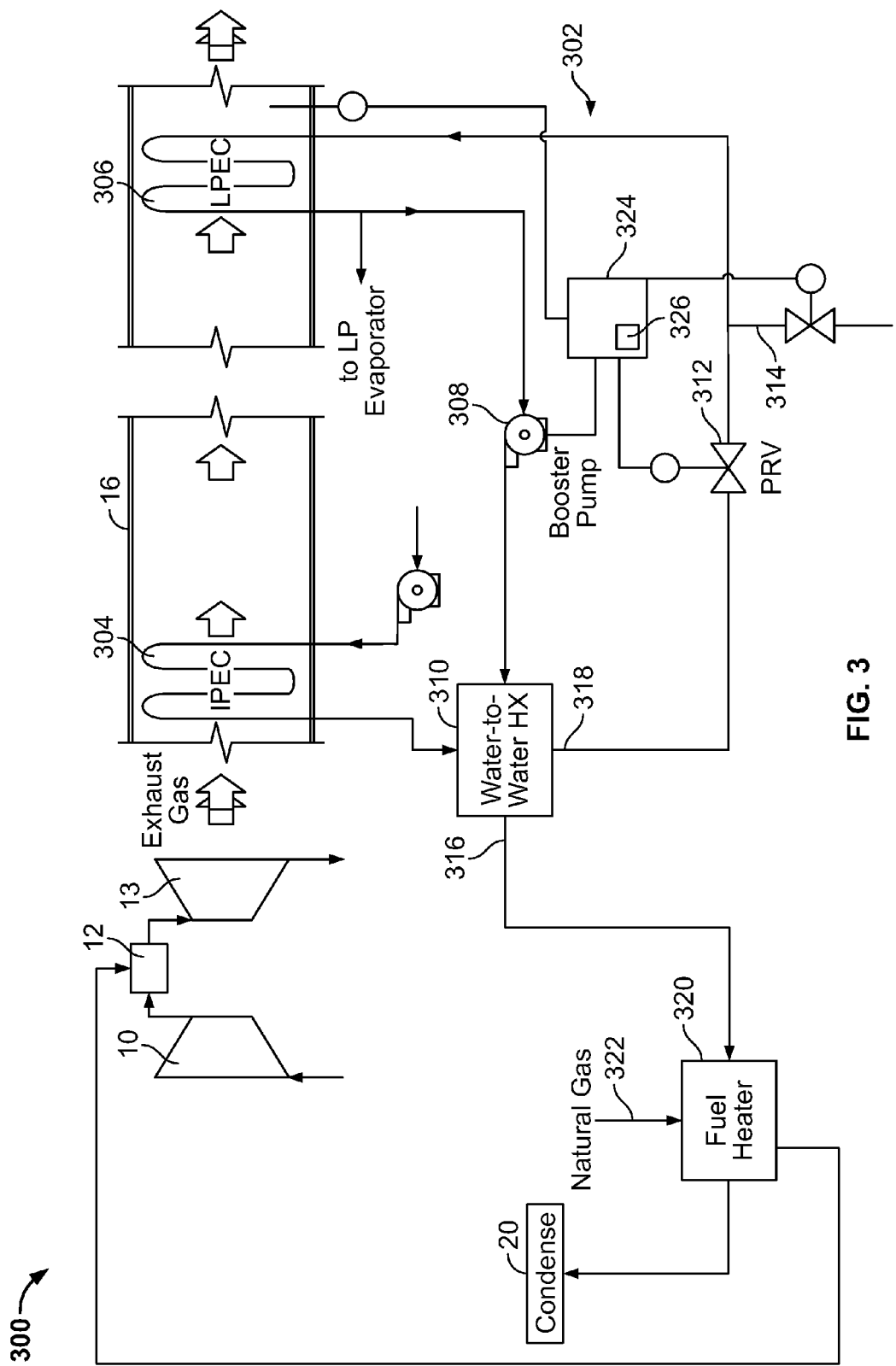

FIG. 3 is a schematic diagram of a natural gas fired combined cycle power generation system 300 in accordance with an exemplary embodiment of the present invention. In the exemplary embodiment, a water circuit 302 is used to transfer heat from a relatively higher-grade heat exchanger such as but not limited to an intermediate pressure economizer 304 to a relatively lower grade heat exchanger such as but not limited to a low-pressure economizer 306. Water circuit 302 includes low-pressure economizer 306, a circulating pump 308, a water-to-water heat exchanger 310 or a flash tank mixing device, a pressure reducing valve 312, and a bypass line 314.

During operation, LP economizer water is pumped to a high pressure in circulating pump 308 and heated using IP economizer water in water-to-water heat exchanger 310. The IP water at a first outlet 316 of water-to-water heat exchanger 310 is channeled to a fuel heater 310 for fuel heating. The LP water at a second outlet 318 of water-to-water heat exchanger 310 is at a temperature of approximately 310 F and approximately 750 psig and is channeled to LP economizer 306 inlet for regulating the flue gas stack temperature. A flow of fuel 322 such as but not limited to natural gas is heated in a fuel heater 304 from a temperature of approximately 80° F. to approximately 365° F. using water from intermediate pressure economizer 304.

Figure 4:
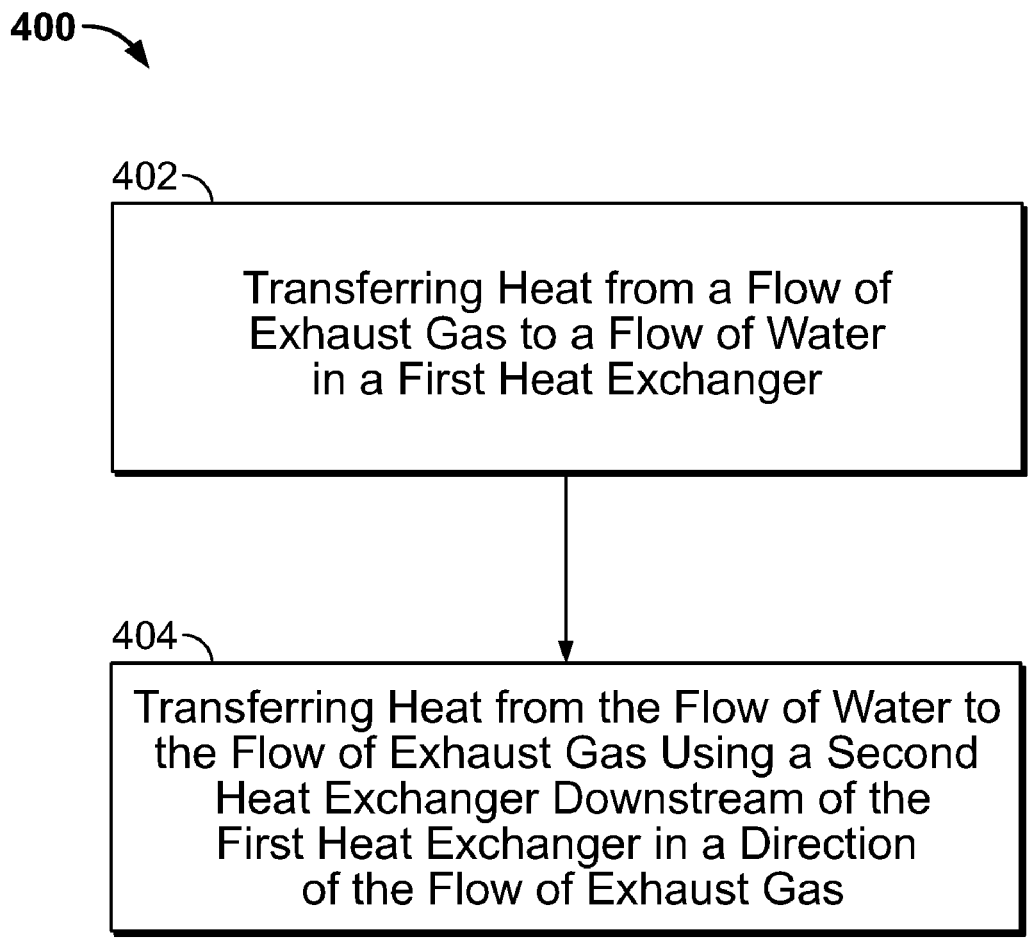

FIG. 4 is a flow diagram of an exemplary method 400 of controlling a temperature of an exhaust gas stack. In the exemplary embodiment, method 400 includes transferring 402 heat from a flow of exhaust gas to a flow of water in a first heat exchanger and transferring 404 heat from the flow of water to the flow of exhaust gas using a second heat exchanger downstream of the first heat exchanger in a direction of the flow of exhaust gas.

As used herein, flash tank mixing vessel refers to a vessel configured to receive flows of fluid at different grades of heat and combine the flows such that a flow from an outlet of the flash tank mixing vessel is at a temperature and pressure resulting from combining and mixing the received flows. Accordingly, in the exemplary embodiment, system 300 includes a controller 324 configured to control the stack temperature using any combination of the inlet flows and may control the outlet temperature and pressure based on a mode of operation of system 300. As used herein, a mode of operation refers to a particular equipment lineup and/or power level output of gas turbine engine 13 and/or steam turbine 18. In the exemplary embodiment, controller 324 includes a processor 326 that is programmable to include instructions for performing the actions described herein. In one embodiment, controller 324 is a stand alone controller. In an alternative embodiment, controller 324 is a subpart or module of a larger controller system such as for example, but not limited to a distributed control system (DCS).

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 242, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is controlling fuel heater water for regulating the flue gas stack temperature. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a systems and method for controlling HRSG heat exchanger water for regulating the flue gas stack temperature provides a cost-effective and reliable means of improving the efficiency of the power generation system by transferring heat from a relatively higher grade heat exchanger to a relatively lower grade heat exchanger during relatively low load periods of operation of the combined cycle power generation system. As a result, the systems and method described herein facilitate increasing the efficiency of the power generation system in a cost-effective and reliable manner.

An exemplary systems and method for controlling fuel heater water for regulating the flue gas stack temperature are described above in detail. The systems illustrated are not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. A stack temperature control system comprising:
a first heat exchanger positioned upstream in exhaust gas flow communication to an exhaust gas inlet to the stack;
a second heat exchanger positioned upstream in exhaust gas flow communication to the first heat exchanger; and
a water side conduit configured to direct a flow of relatively hot water from said second heat exchanger to said first heat exchanger such that a temperature of a flow of exhaust gas flowing through said first heat exchanger is maintained within a predetermined range by heat transferred from the flow of relatively hot water from said second heat exchanger to the flow of exhaust gas flowing said first heat exchanger.

2. A system in accordance with claim 1 wherein the flow of exhaust gas flowing through said first heat exchanger is maintained such that a temperature of the flow through said first heat exchanger is maintained greater than at least one of a sulfur dew point temperature and an acid dew point temperature.

3. A system in accordance with claim 1 wherein said second heat exchanger comprises a high pressure economizer of a heat recovery steam generator.

4. A system in accordance with claim 3 wherein said water side conduit comprises a fuel heater and a pressure reducing valve.

5. A system in accordance with claim 1 wherein said second heat exchanger comprises an intermediate pressure economizer of a heat recovery steam generator.

6. A system in accordance with claim 5 wherein said water side conduit comprises a pressure reducing valve and at least one of a water-to-water heat exchanger and a flash tank mixing vessel.

7. A system in accordance with claim 5 wherein said water side conduit comprises a bypass used to control a mass flow rate of water through the first heat exchanger.

8. A method of controlling a temperature of an exhaust gas stack, said method comprising:
transferring heat from a flow of exhaust gas to a flow of water in a first heat exchanger; and
transferring heat from the flow of water to the flow of exhaust gas using a second heat exchanger downstream of the first heat exchanger in a direction of the flow of exhaust gas.

9. A method in accordance with claim 8 wherein transferring heat from the flow of water to the flow of exhaust gas using a second heat exchanger comprises transferring heat from the flow of water to the flow of exhaust gas using a low pressure economizer.

10. A method in accordance with claim 8 further comprising reducing a pressure of the flow of water using a pressure reducing valve upstream from the second heat exchanger.

11. A method in accordance with claim 8 wherein transferring heat from a flow of exhaust gas to a flow of water in a first heat exchanger comprises transferring heat from a flow of exhaust gas to a flow of water in a high pressure economizer.

12. A method in accordance with claim 11 further comprising transferring a portion of the heat from the flow of water to a flow of fuel in a fuel heater.

13. A method in accordance with claim 11 further comprising bypassing a portion of the flow of water around the second heat exchanger such that the mass flow rate of water through the second heat exchanger is controlled.

14. A method in accordance with claim 8 wherein transferring heat from a flow of exhaust gas to a flow of water in a first heat exchanger comprises transferring heat from a flow of exhaust gas to a flow of water in an intermediate pressure economizer.

15. A method in accordance with claim 14 further comprising transferring heat from the intermediate pressure economizer to the second heat exchanger using a flash tank mixing device.

16. A method in accordance with claim 14 further comprising circulating water through circuit including a booster pump, a flash tank mixing device, a pressure reducing valve and a water side of the second heat exchanger, the a flash tank mixing device receiving heat from the intermediate pressure economizer.

17. A combined cycle power generation system including at least one gas turbine and at least one steam turbine thermally interconnected through at least one heat recovery steam generator; the combined cycle power generation system comprising:
a first heat exchanger positioned upstream in exhaust gas flow communication to a heat recovery steam generator exhaust gas outlet;
a second heat exchanger positioned upstream in exhaust gas flow communication to the first heat exchanger; and
a water side conduit configured to direct a flow of relatively hot water from said second heat exchanger to said first heat exchanger such that a temperature of a flow of exhaust gas flowing through said first exchanger is facilitated being increased.

18. A system in accordance with claim 17 further comprising a controller configured to:

receive a temperature value of the exhaust gases proximate the heat recovery steam generator exhaust gas outlet;

compare the received temperature value to a predetermined allowable range of values; and control at least one of a flow rate of the flow of relatively hot water and a temperature of the flow of relatively hot water such that a flow of exhaust gas exiting the heat recovery steam generator exhaust gas outlet is maintained within the predetermined allowable range of values.

19. A system in accordance with claim 17 wherein said controller is configured to control a bypass flow around said first heat exchanger to control a mass flow rate of water through the first heat exchanger.

20. A system in accordance with claim 17 wherein said water side conduit comprises a pressure reducing valve at least one of a water-to-water heat exchanger and a flash tank mixing vessel.

* * * * *